(12) United States Patent
Kalman (10) Patent No.: US 6,820,211 B2
(45) Date of Patent: Nov. 16, 2004

(54) SYSTEM AND METHOD FOR SERVICING REQUESTS TO A STORAGE ARRAY

(75) Inventor: Dean Alan Kalman, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 507 days.

(21) Appl. No.: 09/894,077

(22) Filed: Jun. 28, 2001

(65) Prior Publication Data

US 2003/0005354 A1 Jan. 2, 2003

(51) Int. Cl.[7] .............................................. G06F 11/00
(52) U.S. Cl. .......................................... 714/6; 711/714
(58) Field of Search ...................... 714/6, 7, 8; 711/111, 711/112, 114

(56) References Cited

U.S. PATENT DOCUMENTS

| | | | | |
|---|---|---|---|---|
| 4,135,240 A | * | 1/1979 | Ritchie ........................ | 711/164 |
| 5,522,031 A | * | 5/1996 | Ellis et al. ...................... | 714/6 |
| 5,600,783 A | * | 2/1997 | Kakuta et al. .................. | 714/6 |
| 5,774,643 A | * | 6/1998 | Lubbers et al. ................ | 714/20 |
| 5,875,456 A | * | 2/1999 | Stallmo et al. ............. | 711/114 |
| 6,058,489 A | | 5/2000 | Schultz et al. | |
| 6,061,750 A | | 5/2000 | Beardsley et al. | |
| 6,067,635 A | * | 5/2000 | DeKoning et al. ............. | 714/6 |
| 6,085,333 A | | 7/2000 | DeKoning et al. | |
| 6,098,119 A | * | 8/2000 | Surugucchi et al. .......... | 710/10 |
| 6,243,827 B1 | * | 6/2001 | Renner, Jr. ..................... | 714/6 |
| 6,338,126 B1 | * | 1/2002 | Ohran et al. ................ | 711/162 |
| 6,728,833 B2 | * | 4/2004 | Pruett et al. ................ | 711/114 |

FOREIGN PATENT DOCUMENTS

JP  11120113 A2  4/1999

* cited by examiner

*Primary Examiner*—Scott Baderman
*Assistant Examiner*—Joshua Lohn
(74) *Attorney, Agent, or Firm*—Dillon & Yudell, LLP (57) ABSTRACT

According to the method of the present invention, if a data read request to an unavailable particular storage medium is received from a system processor, a request servicing circuit of an adapter reconstructs the request data from data and parity data stored on other storage media in the array. However, if a data write request to an unavailable storage medium is received from the system processor, the actual data related to the data write request is stored in a temporary memory location, and the data write request is logged in a non-volatile memory. There is no built-in data redundancy in a first preferred embodiment of the present invention; thus, modified data is lost in the event of the failure of another storage medium during the update of the selected storage medium. However, a second preferred embodiment of the present invention incorporates a spare storage medium that preserves the modified data if another storage medium fails.

24 Claims, 5 Drawing Sheets

Data Processing System
10

Fig. 3A (Updating)

| STRIPE NUMBER | STORAGE MEDIUM 1 | STORAGE MEDIUM 2 | STORAGE MEDIUM 3 |
|---|---|---|---|
| 1 | D0 | D1 | P1 |
| 2 | D2 | P2 | D3 |
| 3 | P3 | D4 | D5 |
| ... | ... | ... | ... |
| N | DN | PN | DN+1 |
|  |  |  |  |

*Fig. 3B*

(Updating)

| STRIPE NUMBER | STORAGE MEDIUM 1 | STORAGE MEDIUM 2 | STORAGE MEDIUM 3 | SPARE STORAGE MEDIUM 4 |
|---|---|---|---|---|
| 1 | D0 | D1 | P1 | D1' |
| 2 | D2 | P2 | D3 |  |
| 3 | P3 | D4 | D5 |  |
| ... | ... | ... | ... | ... |
| N | DN | PN | DN+1 |  |
|  |  |  |  |  |

*Fig. 4B*

SYSTEM AND METHOD FOR SERVICING REQUESTS TO A STORAGE ARRAY

BACKGROUND OF THE INVENTION

1. Technical Field

The present invention relates in general to data processing systems, and more particularly, data storage within data processing systems. Still more particularly, the present invention relates to a system and method for handling data requests within data processing systems.

2. Description of the Related Art

In modem computer systems, users frequently access common data stored in a redundant array of inexpensive disks (RAID) of a central networked computer. Redundancy is employed so that if a hard disk of the RAID fails, the data stored on the failed hard disk can be rebuilt utilizing data and parity data stored on the other hard disks of the RAID while the failed hard disk is taken off-line and repaired.

Hard disks within a RAID frequently are subject to numerous accesses ranging from relatively short data writes or reads to relatively lengthy updates of the configuration of the hard disk. During access to a disk, one or more users of the computer system may be unable to access the data on the disk. Such users typically wait until the hard disk completes the previous process until their data access requests can be fulfilled.

An example of a lengthy hard disk update that would restrict user access to data is a firmware update. Firmware updates may be required, for example, to resolve incompatibilities between components (e.g., hard disks) or to correct errors in the firmware that are not detected until after the release of the firmware.

An update to the firmware of a conventional hard disk cannot be performed when the drive is on-line. Because of this limitation, hard disk firmware updates are performed in a controlled operating system environment with the selected hard disk set to an off-line mode to prevent access to the hard disk. Utilizing a single threaded environment (e.g., disk operating system, or DOS) allows a hard disk firmware update application to assume control of the computer system and prevent other applications from accessing the hard disk during the firmware update.

Because many computer systems and networks employ multi-threaded operating systems (e.g., Windows NT), to perform a firmware update, an administrator typically shuts down the multi-threaded operating system, takes the computer system off-line, boots DOS, runs the hard disk update software, and waits for the update to complete. During the firmware update, the RAID is taken off-line, which prevents other users from accessing the data stored on the RAID.

Thus, it is often the case that users may request access to data stored on a hard disk that is unavailable due to an update, repair, or another access. The present invention recognizes that a system and method for servicing a data request to an unavailable hard disk without waiting for the update, access, or repair to be completed, would improve the overall of a data processing system.

SUMMARY OF THE INVENTION

To overcome the foregoing and additional limitations of the prior art, the present invention presents an improved system and method of servicing a data request to a storage media array. In accordance with a preferred embodiment of the present invention, the data processing system includes an adapter and a redundant array of inexpensive disks (RAID). The adapter includes an updating circuit and a request servicing circuit.

According to the method of the present invention, if a data read request to an unavailable particular storage medium is received from a system processor, a request servicing circuit of an adapter reconstructs the request data from data and parity data stored on other storage media in the array. However, if a data write request to an unavailable storage medium is received from the system processor, the actual data related to the data write request is stored in a temporary memory location, and the data write request is logged in a non-volatile memory. There is no built-in data redundancy in a first preferred embodiment of the present invention; thus, modified data is lost in the event of the failure of another storage medium during the update of the selected storage medium. However, a second preferred embodiment of the present invention incorporates a spare storage medium that preserves the modified data if another storage medium fails.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
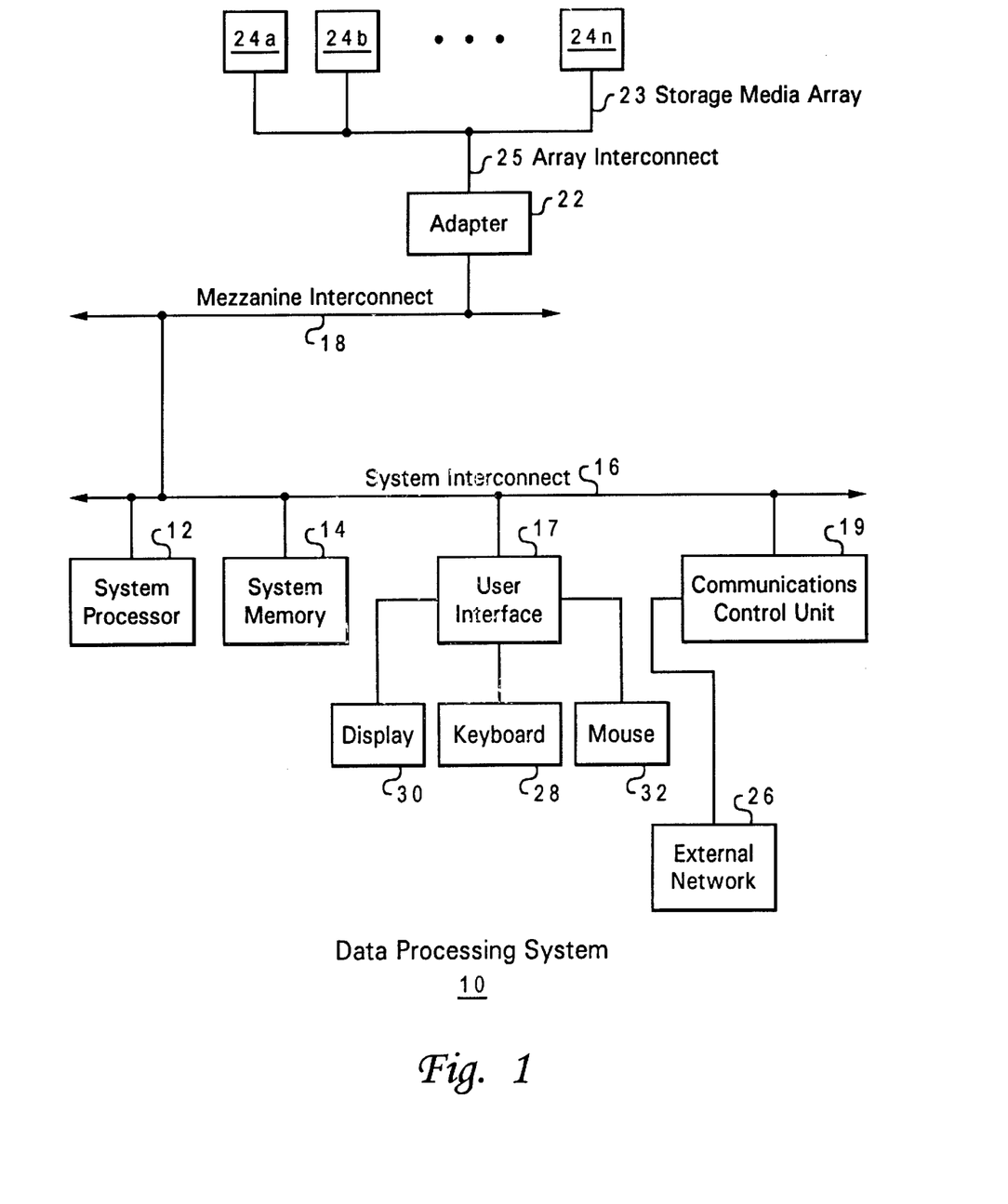
FIG. 1 depicts a detailed block diagram of an exemplary data processing system, which may be utilized to implement the present invention.

With reference now to the figures and in particular with reference to FIG. 1, there is depicted a detailed block diagram of a data processing system 10 in which a preferred embodiment of the present invention may be implemented. As illustrated, data processing system 10 includes a system processor 12, a system memory 14, a user interface 17, and a communications control unit 19, all coupled via a system interconnect 16. System processor 12, which may be implemented as one or more processors, such as any generation of Pentium™ processor available from Intel Corporation in Santa Clara, Calif., executes software instructions to control the operation of data processing system 10. System memory 14 provides storage for software and data and may include both read-only memory (ROM) and random access memory (RAM).

It should be readily apparent to those skilled in the art that system interconnect 16 may be implemented as a bus, a switch or any other type of coupling apparatus. User interface 17 provides an interface between data processing system 10 and peripherals employed by a user to interact with data processing system 10. User interface 17 may include various adapters and drivers for controlling peripherals, such as keyboard 28, display 30, and mouse 32. Communications control unit 19 provides an interface between data processing system 10 and an external network 26, which may be a local area network (LAN) or a wide area network (WAN) such as the Internet.

An adapter 22 controls access and updates to a storage media array 23 via an array interconnect 25 and is coupled to system processor 12 by a mezzanine interconnect 18, which in a preferred embodiment of the present invention may be implemented as a peripheral component interconnect (PCI) bus. Array interconnect 25 can be implemented as a small computer system interface (SCSI) bus. It should be readily apparent to those skilled in the art that any interconnect system (e.g., integrated device electronics, or IDE) may be implemented to couple storage media array 23 to system processor 12. Storage media array 23 can be implemented as a redundant array of inexpensive disks (RAID) 24a–24n.

Figure 2:
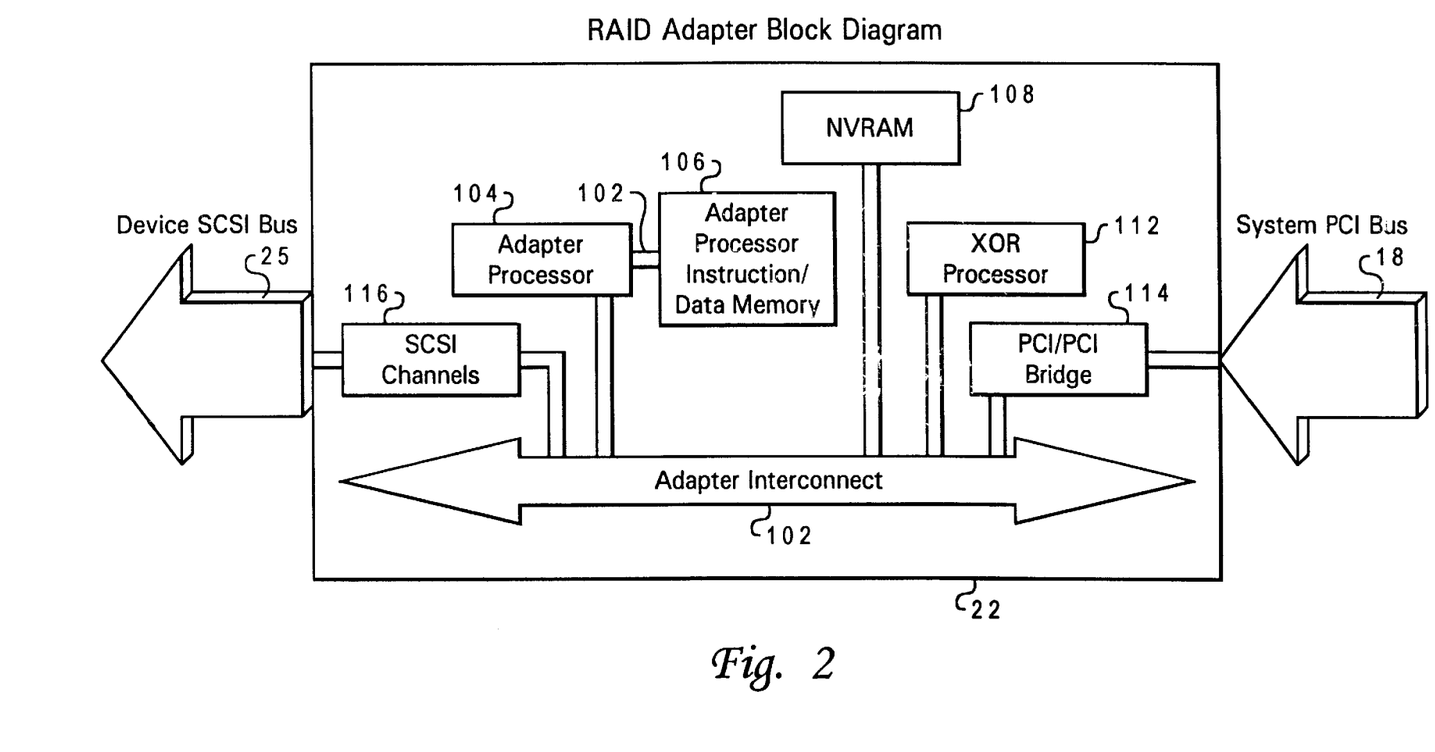
FIG. 2 illustrates a detailed block diagram of an adapter for a storage array in accordance with a preferred embodiment of the present invention.

Referring now to FIG. 2, a detailed block diagram is illustrated of an adapter 22 utilized by a data processing system 10, as depicted in FIG. 1, according to a preferred embodiment of the present invention. Adapter 22 coordinates updates and services data requests to storage media array 23 by system processor 12 or by other networked data processing systems coupled to data processing system 10.

As depicted, adapter 22 includes an adapter processor 104 that is implemented as an updating circuit for coordinating accesses and updates to storage media array 23. Coupled to adapter processor 104 via an adapter interconnect 102 is an adapter processor memory 106, which functions as a cache memory for adapter processor 104.

Further coupled to adapter processor 104 is non-volatile random access memory (NVRAM) 108. During an update to a selected storage medium of storage media array 23, adapter 22 receives a data write request from system processor 12. NVRAM 108 logs the data write request as a "dirty stripe", or a stripe of modified data. The actual data from the data write request are stored in another storage medium in the array. Requests for data during an update to the storage medium of storage media array 23 are handled by a request servicing circuit, implemented as an exclusive-OR (XOR) processor 112, coupled by adapter interconnect 102.

Adapter 22 finally includes PCI/PCI bridge 114, and small computer system interface (SCSI) channels 116 to facilitate data communication between system PCI bus 18 and SCSI bus 25.

Figure 3A:
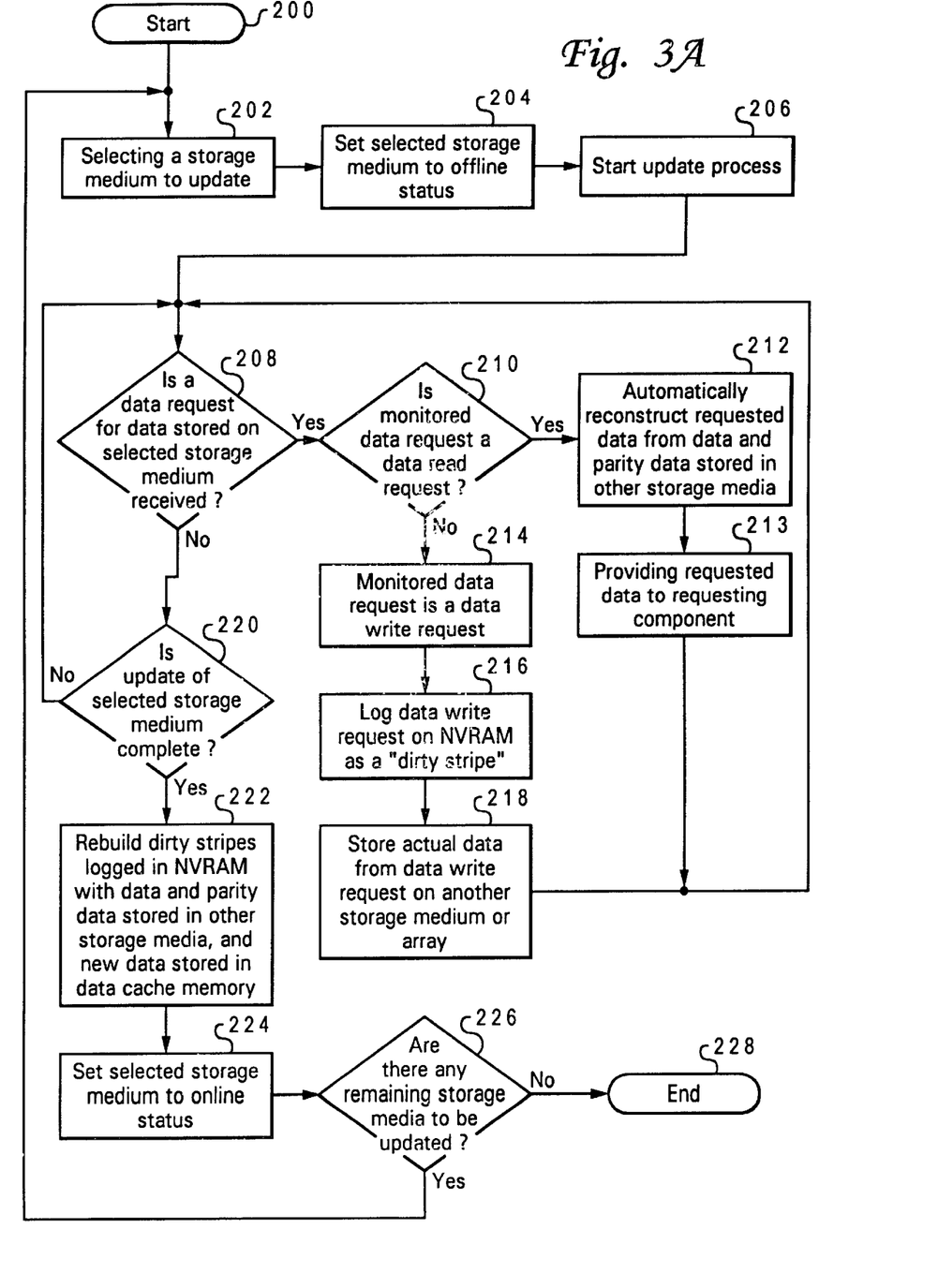
FIG. 3A depicts a high-level logic flowchart illustrating a first method for servicing a data request to a storage array according to a preferred embodiment of the present invention.
Figure 3B:
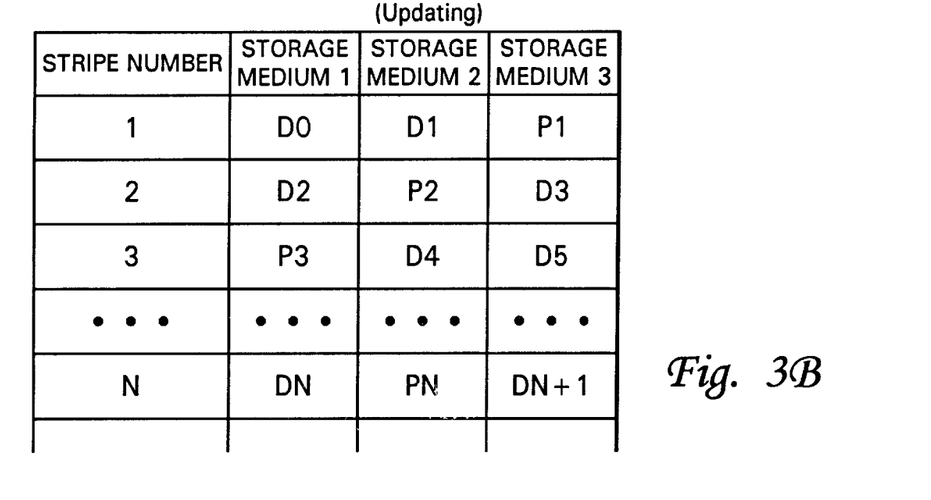
FIG. 3B illustrates a table depicting a redundant array of inexpensive disks (RAID) implementing a first method of servicing a data request to a storage array according to a preferred embodiment of the present invention.

With reference now to FIG. 3A, there is illustrated a high-level logic flowchart depicting an exemplary method by which an adapter 22 services a request to access a storage media array 23 according to a first embodiment of the present invention. In FIG. 3B, there is depicted a table that illustrates an exemplary RAID that stores data in stripes across three storage media.

As depicted in FIG. 3A, the method begins at block 200 and then continues to an update loop including blocks 202, 204, and 206. During the execution of the update loop, an adapter processor 104 (or other suitable updating circuit) selects a storage medium to update out of storage media array 23, as shown in block 202. In this example, adapter 22 selects storage medium 2 for updating, as depicted in FIG. 3B. As illustrated in block 204, adapter processor 104 sets the storage medium 2 to an off-line status, and begins relaying update data (e.g., updated firmware) to storage medium 2, as depicted in block 206.

The process then enters a request servicing loop that includes blocks 208, 210, 212, 213, 214, 216, 218 and 220. The request servicing loop illustrates the process of providing a user with requested data that is located on a selected, inaccessible storage medium. In this example, as depicted in FIG. 3B, storage medium 2 is inaccessible at this time because adapter 22 had been instructed by system processor 12 to perform an update to storage medium 2.

During the update of storage medium 2, adapter 22 monitors for data requests to the selected storage medium, as shown in block 208. If adapter 22 monitors a data request to the selected storage medium and the data request is a data read request (e.g., a data read request for data D1 of FIG. 3B), as depicted in block 210, the requested data D1 are automatically reconstructed by a request servicing circuit, implemented as a XOR processor 112, utilizing data D0 and parity data P1 stored in other storage media in the array, as shown in block 212. The request servicing circuit provides the requested data to the requesting component, as depicted in block 213. The process then returns from block 213 to block 208.

If the data request is not a data read request, the data request is assumed to be a data write request, as illustrated in block 214. The data write request and the location of the data related to the data write request are logged within NVRAM 108, and the actual data corresponding to the data write request are stored another storage medium in the array, as depicted in blocks 216 and 218. The process then returns from block 218 to block 208, where the process monitors for data requests to storage media 2, as illustrated.

If adapter 22 does not receive a data request to the selected storage medium, the process moves from block 208 to block 220, which depicts a determination of whether or not the update of the selected storage medium is complete. If the update of the selected storage medium is not complete, the process returns from block 220 to block 208 where adapter 22 continues to monitor for a data request to the selected storage medium.

If the update of the selected storage medium is complete, the process continues to block 222, where each dirty stripe logged in NVRAM is rebuilt with data and parity data stored on other the storage media in the storage media array, and the new data stored in the temporary location in the other storage media. The selected storage medium is then set to an online status by adapter 22, as depicted in block 224. Finally, if there are remaining storage media to be updated, the process returns from block 226 to block 202, where the process reenters the update loop. If there are no remaining storage media to be updated, the process ends, as shown in block 228.

One drawback to the method outlined by a preferred first embodiment of the present invention, as depicted in FIGS. 3A and 3B, is the lack of redundancy in the system. If another storage medium (storage media 1 or 3, as illustrated in FIG. 3B) fails during the update of storage medium 2, the entire storage media array 23 is taken off-line. The failed storage medium (storage media 1 or 3) is repaired and then rebuilt utilizing data and parity data from the other two storage media. However, any modified data for storage medium 2 temporarily stored on the failed storage medium during the update are lost.

Figure 4A:
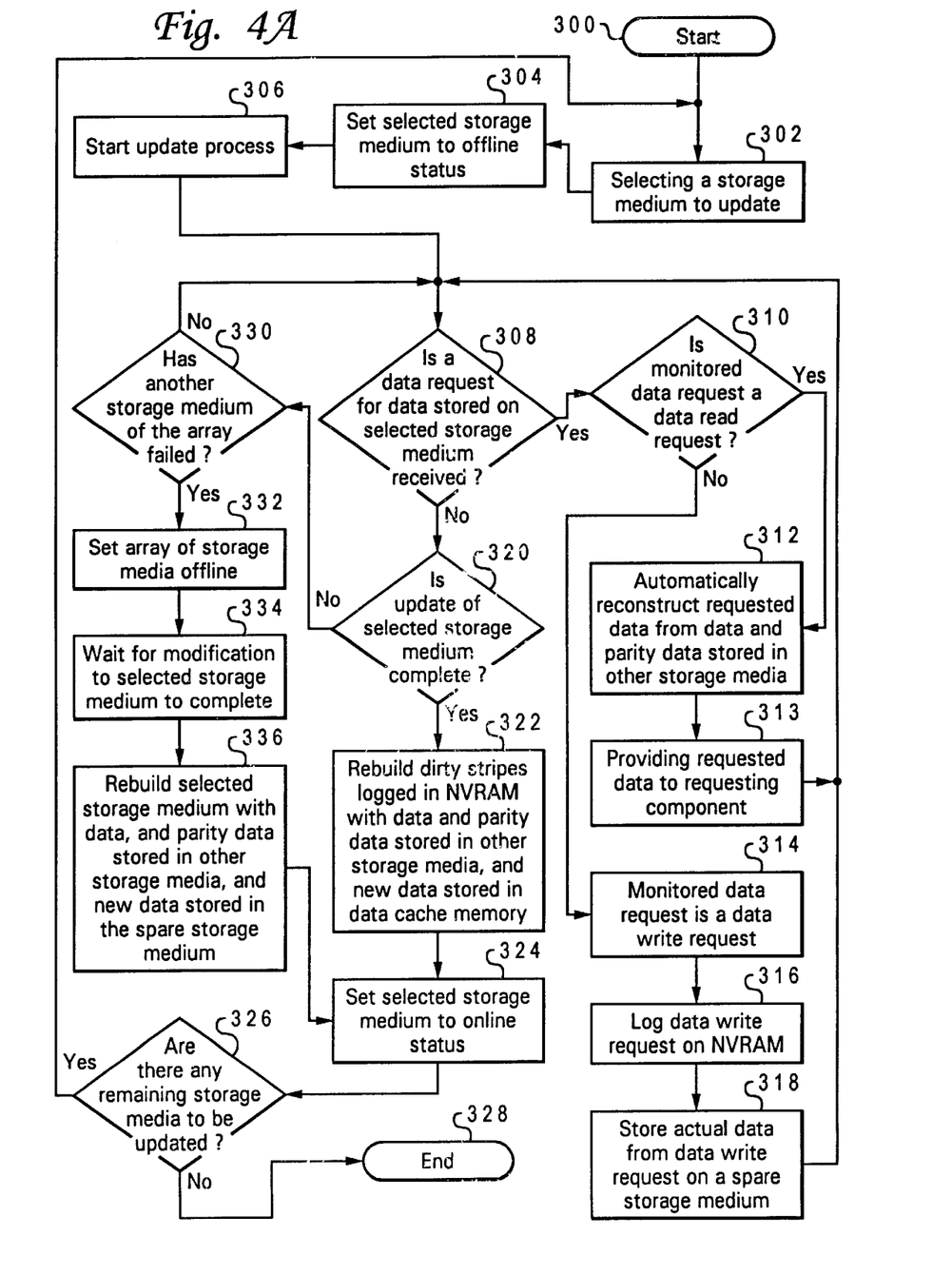
FIG. 4A depicts a high-level logic flowchart illustrating a second method for servicing a data request to a storage array including a spare storage medium according to a preferred embodiment of the present invention.

Referring to FIGS. 4A, a high-level logic flowchart depicting an exemplary method by which an adapter 22 services a request to access a storage media array according to a second embodiment of the present invention. Illustrated in FIG. 4B, there is depicted an exemplary RAID that stores data in stripes across four storage media. Included in storage media array 23 is a spare storage medium for storing data and write data requests during a selected storage medium update controlled by adapter 22.

As depicted, the method begins at block 300 and then continues to block 302, which is illustrated as an update loop including blocks 302, 304 and 306. The update loop depicts the selection and update of a storage medium. During the execution of the update loop, an adapter processor 104, implemented as an updating circuit, selects a storage medium to update out of a storage media array 23, as shown in block 302. In this example, according to FIG. 4B, adapter 22 selects storage medium 2 for updating. As illustrated in block 304, adapter processor 104 sets storage medium 2 to an off-line status, and begins relaying update data to storage medium 2, as depicted in block 306.

The process then enters a request servicing loop that includes blocks 308, 310, 312, 313, 314, 316, 318 and 320. The request servicing loop illustrates the process of providing a user with requested data that is located on a selected, inaccessible storage medium. The selected storage medium is inaccessible at this time because adapter 22 had been instructed by system processor 12 to perform an update on storage medium 2.

During the update of storage medium 2, adapter 22 monitors for data requests to storage medium 2, as shown in block 308. For example, according to FIG. 4B, if adapter 22 monitors a data request determined to be a data read request for data D1 to storage medium 2, as depicted in block 310, the requested data D1 is automatically reconstructed by XOR processor 112, (or other request servicing circuit), from data D0 and parity data P1 stored in other storage media (e.g., storage media 1 and 3) in the array, as shown in block 312. The request servicing circuit provides the requested data to the requesting component, as depicted in block 313. The process then returns from block 313 to block 308. If the data request is not a data read request, the data request is assumed to be a data write request to storage medium 2, as illustrated in block 314. The data write request is logged within a NVRAM 108 and a spare storage medium 4, as illustrated in block 316. The actual data D1 associated with the data write request is stored in the spare storage medium, as data D1', as depicted in block 318. The process then returns to block 308 from block 318.

If adapter 22 does not receive a data request to the selected storage medium, the process moves to block 320, which depicts a determination of whether or not the update to the selected storage medium is complete. If the update of storage medium 2 is complete, the process continues to block 322, where each dirty stripe logged in NVRAM is rebuilt with data and parity data stored in the other storage media in the array and the new data stored in spare storage medium 4; as illustrated, storage medium 2 is set to an online status by adapter 22, as depicted in block 324. Finally, if there are remaining storage media to be updated, the process returns from block 326 to block 302, where the process reenters the update loop. If there are no remaining storage media to be updated, the process ends, as shown in block 328.

If the update of storage medium 2 is not complete, the process continues to block 330, which illustrates adapter 22 checking if another storage medium of the array has failed. If another storage medium of the array has failed, storage media array 23 is set to off-line status by adapter 22, as shown in block 332. The update of storage medium 2 is completed, as depicted in block 334, and storage medium 2 is rebuilt with data and parity data stored in other storage media, and new data stored in the spare storage medium 4, as illustrated in block 336. The process then continues to block 324. If another storage medium of the array has not failed, the process returns from block 330 to block 308.

Figure 4B:
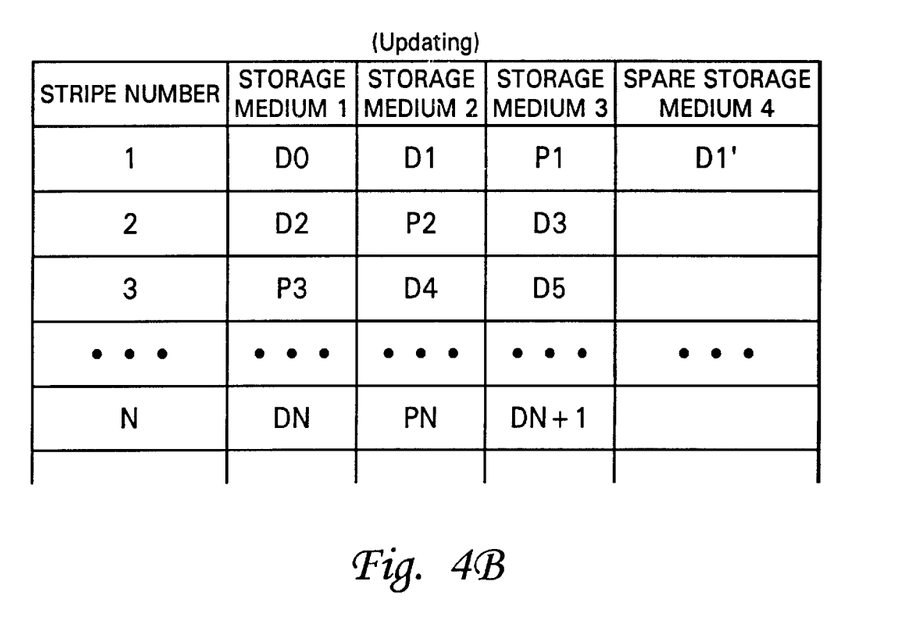
FIG. 4B illustrates a table depicting a RAID implementing a second method of servicing a data request to a storage array according to a preferred embodiment of the present invention.

This second preferred embodiment of the present invention addresses the drawback of the first embodiment. As illustrated in FIG. 4B, spare storage medium 4 records the modified data to be transferred to storage medium 2 when the update is complete. Therefore, if one of the other storage media fails during the update of storage medium 2, the modified data are preserved on spare storage medium 4.

As described above, an improved system and method of servicing a request to an array of storage media is presented. A data processing system, according to a preferred embodiment of the present invention includes a storage media array and an adapter to interface with the storage media array. If a data read request to a particular storage medium is received from a system processor, a request servicing circuit of the adapter reconstructs the request data from data and parity data stored on other storage media in the array. However, if a data write request to an unavailable storage medium is received from the system processor, the actual data related to the data write request are stored in a temporary memory location, and the data write request is logged in a non-volatile random access memory (NVRAM). There is no built-in data redundancy in a first preferred embodiment of the present invention; thus, modified data are lost in the event of the failure of another storage medium during the update of the selected storage medium. However, a second preferred embodiment of the present invention incorporates a spare storage medium that preserves the modified data if another storage medium fails.

While the invention has been particularly shown and described with reference to a preferred embodiment, it will be understood by those skilled in the art that various changes in form and detail may be made therein without departing from the spirit and scope of the invention. For example, the data on a storage medium in a RAID utilizing the present invention may still be accessed by a user even if the storage medium is off-line due to required maintenance.

What is claimed is:

1. A method of servicing a request to a redundant storage array including a plurality of storage media containing data and related parity data, said method comprising:

a storage adapter receiving, from an operating system of a data processing system, a command to place a selected storage medium among said plurality of storage media that is electrically coupled to said storage adapter in an off-line state to perform an update to control program for said selected storage medium;

said storage adapter receiving a data request for data stored by a selected storage medium among said plurality of storage media; and while the selected storage medium is electrically coupled to the adapter and the update to the control program of said selected storage medium is being performed, servicing said data request by reference to said data and said related parity data of other storage media among said plurality of storage media.

2. The method according to claim 1, said step of servicing further including:
   automatically reconstructing requested data utilizing said data and related parity data from said other storage media; and
   outputting said reconstructed requested data.

3. The method according to claim 2, said step of automatically reconstructing further including:
   determining a type of said data request; and
   automatically reconstructing requested data utilizing said data and said related parity data only in response to determining that said data request is a data read request.

4. The method according to claim 3, said step of determining further comprising:
   in response to determining that said data request is a data write request, logging said data write request;
   storing new data for said data write request;
   setting said particular storage medium to a rebuild status;
   rebuilding said particular storage medium utilizing said data and related parity data from said other storage media; and
   setting said particular storage medium to online status.

5. The method according to claim 1, wherein said particular storage medium is a disk, and said redundant storage array is a redundant disk array and wherein:
   receiving a data request for data stored by a particular storage medium comprises receiving a data request for data stored by a particular disk of said redundant disk array.

6. An adapter for use with a data processing system including a redundant storage array including a plurality of storage media containing data and related parity data, said adapter comprising:
   an adapter processor including:
      an updating circuit for receiving a data request for data stored by a selected storage medium among said plurality of storage media;
      a command processing circuit for receiving, from an operating system of a data processing system, a command to place a selected storage medium among said plurality of storage media that is electrically coupled to said storage adapter in an off-line state to perform an update to control program for said selected storage medium; and
   a request servicing circuit, while the selected storage medium is electrically coupled to the adapter and the update to said control program for said selected storage medium is being performed, for servicing said data request by reference to said data and said related parity data of other storage media among said plurality of storage media.

7. The adapter according to claim 6, wherein said request servicing circuit is an exclusive-OR (XOR) processor for automatically reconstructing requested data utilizing data and related parity data from other storage media during said updating, in response to a data request by said system processor, said XOR processor coupled to an adapter processor.

8. The adapter according the claim 7, wherein said data request is a data read request.

9. The adapter according to claim 6, further including:
   a non-volatile random access memory (NVRAM) for logging data write requests.

10. The adapter according to claim 6, further comprising:
   a storage location for temporarily storing write data for said selected storage media during said updating.

11. The adapter according to claim 10, wherein said storage location is an adapter cache.

12. The adapter according to claim 11, wherein said adapter cache further includes:
   a battery-backup circuit, for preserving data stored on said adapter cache.

13. A disk system comprising:
   an adapter according to claim 6; and
   a redundant storage array.

14. The adapter according to claim 6, wherein said redundant storage array is a redundant array of inexpensive disks (RAID).

15. A data processing system, comprising:
   a system processor;
   a system memory coupled to said system processor;
   a redundant storage array; and
   an adapter including a redundant storage array including a plurality of storage media containing data and related parity data, said adapter further including:
      an adapter processor including:
         an updating circuit for receiving a data request for data stored by a selected storage medium among said plurality of storage media;
         a command processing circuit for receiving, from an operating system of a data processing system, a command to place a selected storage medium among said plurality of storage media that is electrically coupled to said storage adapter in an off-line state to perform an update to control program for said selected storage medium; and
      a request servicing circuit, in response to receiving said request while an update to said selected storage medium is being performed, for servicing said data request by reference to said data and said related parity data of other storage media among said plurality of storage media.

16. The data processing system according to claim 15, wherein said redundant storage array is a redundant array of inexpensive disks (RAID).

17. The data processing system according to claim 15, wherein said redundant storage array stores data in stripes, wherein each said stripe further includes data and related parity data.

18. The data processing system according to claim 17, wherein said request servicing circuit is an exclusive-OR (XOR) processor for automatically reconstructing requested data utilizing said data said related parity data from other storage media during said updating, in response to a data request by said system processor, said XOR processor coupled to said adapter processor.

19. The data processing system according to claim 15, wherein said adapter further comprising:
   a non-volatile random access memory (NVRAM) for logging all data write requests and data read-with-intent-to-write requests.

20. The data processing system according to claim 15, further including:
   a storage location for temporarily storing all write data for said selected storage media during said updating.

21. The data processing system according to claim 20, wherein said storage location is a temporary space on other storage media of said redundant storage array.

22. The data processing system according to claim 20, wherein said storage location is an adapter cache.

23. The data processing system according to claim 22, wherein said adapter further includes a battery backup circuit.

24. A computer program product comprising:

a computer-readable medium;

command receiving code within said computer-readable medium for receiving, from an operating system of a data processing system, a command to place a selected storage medium among a plurality of storage media that is electrically coupled to a storage adapter in an off-line state to perform an update to control program for said selected storage medium;

updating code encoded within said computer-readable medium for receiving a data request for data stored by the selected storage medium among the plurality of storage media; and request servicing code encoded within said computer-readable medium, while an update to said control program for said selected storage medium is being performed and the selected storage medium is electrically coupled to the adapter, for servicing said data request by reference to data and related parity data of other storage media among said plurality of storage media.

* * * * *